UNITED STATES PATENT OFFICE.

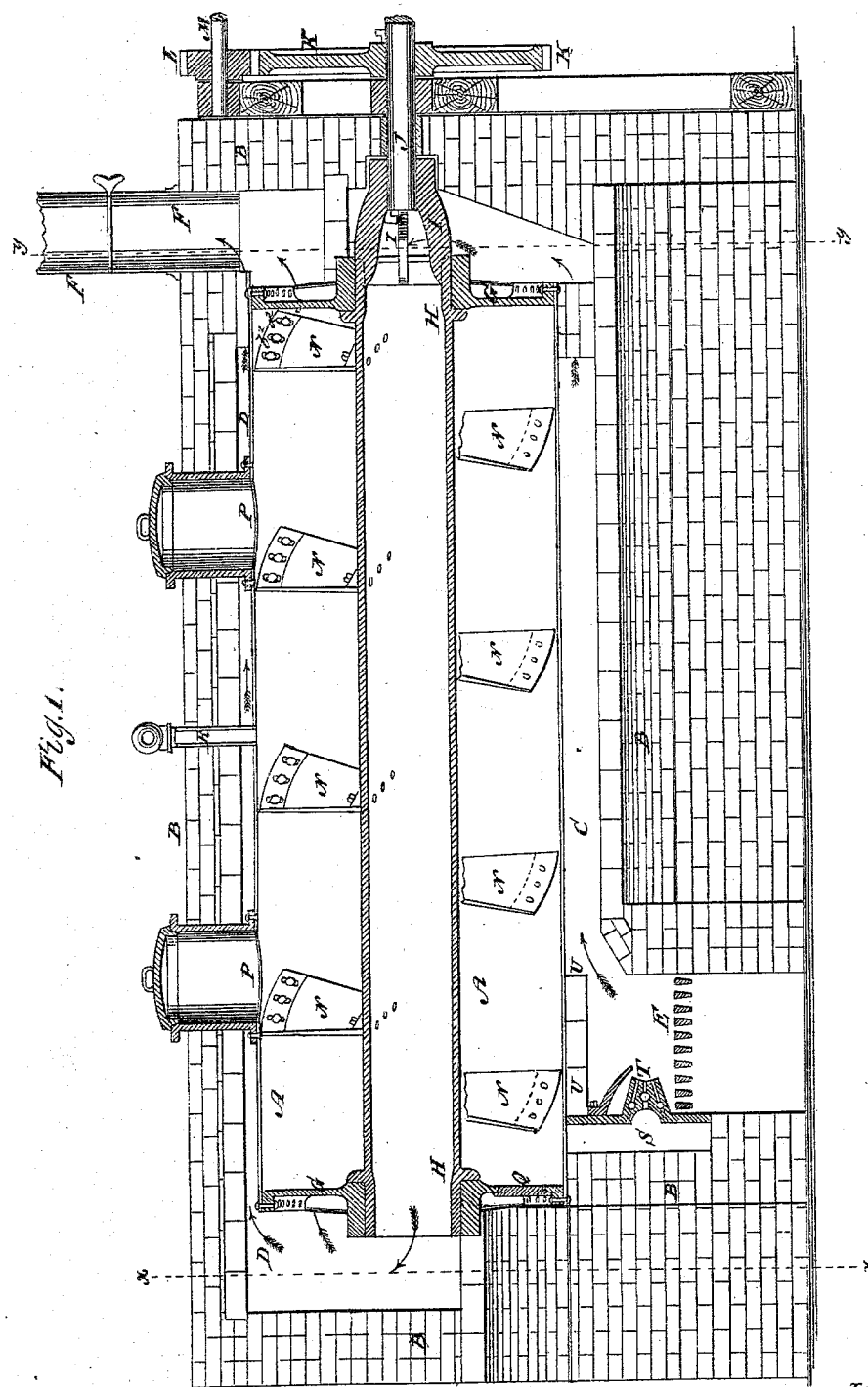

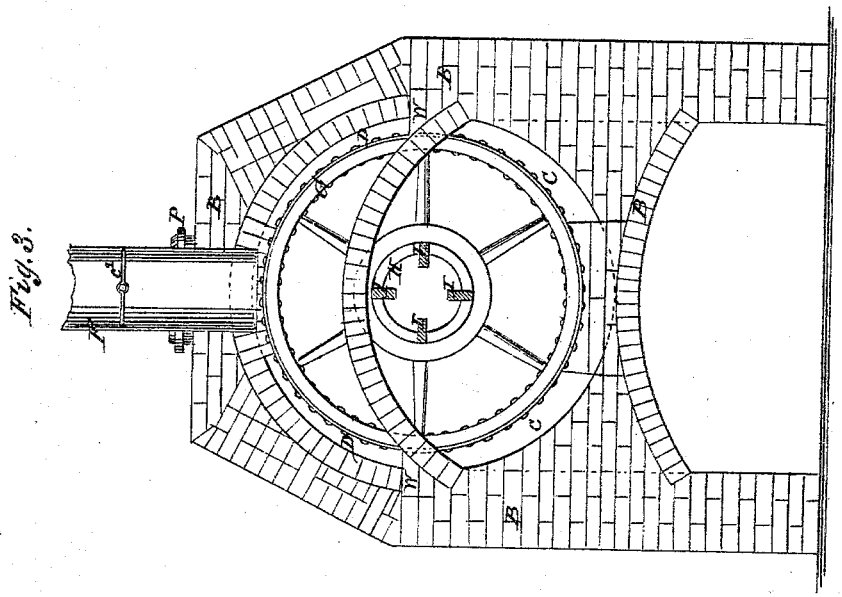
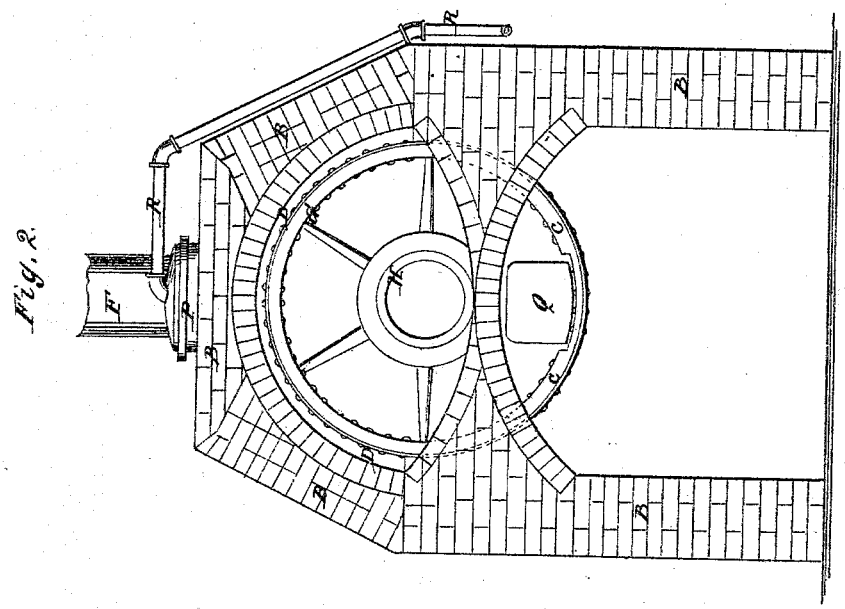

COSMORE G. BRUCE AND MICHAEL J. STEIN, OF NEW YORK, N. Y.

IMPROVEMENT IN PROCESSES AND APPARATUS FOR TREATING AND DRYING ANIMAL MATTER.

Specification forming part of Letters Patent No. 132,243, dated October 15, 1872.

*To all whom it may concern:*

Be it known that we, COSMORE G. BRUCE and MICHAEL J. STEIN, of New York city, in the State of New York, have invented an Improved Process and Apparatus for Drying Animal Matter; and we do hereby declare that the following is a full and exact description thereof, reference being had to the accompanying drawing making part of this application.

Previous to our invention it has been suggested to dry fish, scrap, and other animal matter by the direct action of the products of combustion upon a revolving cylinder and the scrap therein contained; but in the various applications of this idea the process and apparatus have been found to embody many and serious objections or defects, among which may be mentioned their incapacity to effectually prevent the escape of all noxious gases and odors, and the necessity for passing the material to be dried several times through the cylinder or subjecting it to the process several times at great expense of time, labor, and fuel. It has also been suggested (and numerous patents have been granted therefor) to employ a closed vessel—in some cases stationary and in others rotary—for the treatment of the material to prevent the escape of the noxious odors; but in this kind of apparatus it has been customary generally to employ steam as the medium for heating the surfaces to act on the contained mass.

Our invention has for its object to provide a process and apparatus by means of which the drying of all sorts of animal matter or scrap for the manufacture of fertilizers may be effected in a most thorough and economic manner, while, at the same time, all escape of noxious odors and other nuisances are effectually prevented and a fertilizer produced which is richer than most of the products of animal-matter drying processes heretofore produced; and to these ends our invention consists in subjecting the scrap to the action of dry heat alone while in a state of agitation in an air-tight or closed chamber, as will be hereinafter more fully explained; and our invention further consists in an apparatus composed of a closed vessel so mounted in suitable masonry over a furnace that while the products of combustion surround it they are compelled to travel the whole length of said vessel in contact with its lower portion before they can pass to the upper portion thereof, as will be presently explained, whereby we are enabled to produce the best results with a given amount of fuel, as will be hereinafter more fully described; and our invention further consists in an apparatus so constructed that the products are not only passed along in contact with the whole external surface of the drying-chamber, but are also carried through the interior of said chamber by means of one or more hollow flues or shafts, which receive the products of combustion after they have passed along in contact with the lower external portion of the vessel, as will be hereinafter more fully explained; and our invention further consists in the use, in combination with the stationary drying-chamber and the furnace, of a suitable means for protecting that part of the vessel which is subjected to the most intense heat, so that all danger of burning any portion of the contained mass is effectually avoided and the contained charge subjected at all points to a degree of heat sufficient merely to perform the drying operation, as will be hereinafter more fully described; and our invention further consists in providing the extremities of the stirrers of the agitating mechanism with square-edged steel cutting and scraping plates, as will be hereinafter more fully described; and our invention further consists in making the said steel plates, applied to the stirring-arms, adjustable in different directions, so that they can be moved out and "set" otherwise so as to run close to the internal face of the drying-chamber, all as hereinafter to be more fully described.

To enable those skilled in the art to make and use our invention, we will proceed to describe our improved process and apparatus more in detail, referring by letters of reference to the accompanying drawing, in which—

Figure 1 is a vertical longitudinal section of an apparatus embracing our invention and adapted to carry on our improved process; Fig. 2 is a vertical cross-section of the same at the line $x\,x$ of Fig. 1; and Fig. 3 is a similar vertical section at the line $y\,y$ of Fig. 1.

In the several figures the same part will be found designated by the same letter of reference.

A represents the drying-chamber or vessel, which is about cylindrical in form, as shown, and is mounted in suitable masonry, B, formed with flues or spaces at C D for the passage of the products of combustion from a furnace at E to the chimney at F, as indicated by the arrows in the drawing. The drying chamber or vessel A is, as usual, made of boiler-iron with cast-iron heads G, each of which is formed with a central eye or hub, in which takes its bearing one end of a hollow rotatory shaft or drum, H, which serves as a flue or conductor for the products of combustion, as will be presently explained. One end of this hollow shaft H is provided with a forked extension or straddle-stand, I, which is keyed fast to one end of a driving-shaft, J, as seen at Fig. 1, and this shaft J is provided with a spur-gear, K, with which engages the pinion L of a driving-shaft, M, to which a rotatory motion is imparted by any suitable motor. N N are stirrers or agitating and disintegrating arms, which are arranged helically, as shown, on the shaft H, project radially therefrom, and are armed at their extremities with adjustable steel scrapers or cutting-plates O, as will be presently explained. P P are the usual manholes or charging-doors, through which the material to be treated is put into the vessel A; and Q is the discharge man-hole or door through which the finished material is discharged. R is the pipe or conductor through which the noxious gases and vapors generated within the vessel A are carried off to be destroyed in the furnace, or otherwise treated or disposed of. This gas and vapor conductor R may lead to a chamber at S, from whence the gases enter an Argand burner at T, and, being discharged therefrom in conjunction with jets of air, are consumed in the furnace E, (in a manner fully explained in another patent granted to Michael J. Stein for this mode of destroying the noxious gases,) or it may carry off the gases and vapors to a condenser and auxiliary gas-consuming furnace, or take them to any other desired destination. Immediately over the fire-box and beneath the iron vessel A is arranged a jacket, U, of fire-brick, or a suitable protector of some sort of non-conductive material, for the purpose of protecting the under side or surface of the cylinder A (where it comes close to the fire-chamber) from the action of the intense heat there generated.

In a drying apparatus in which this vessel is either surrounded by a water or steam jacket or space, or is kept in a state of motion (rotation) over the fire, there is no danger of burning the material being treated; but in a simple stationary chamber such as we use, surrounded by the products of combustion, it becomes necessary, we find, to employ some means for preventing that part of the vessel which is immediately over or close to the fire-chamber becoming so intensely hot as to cause some portion of the contained mass to be burned, and thus injured. W is a horizontally-arranged plate, which serves as a sort of partition to divide the upper from the lower half of the flue or space which surrounds the vessel A, and forms the two separate flues C and D, as shown. This partition, together with the mason-work, it will be seen, is so arranged and constructed that all the products of combustion are forced to travel along the lower flue C in contact with the lower half of cylinder A, from one end to the other, before they can begin to ascend. They have then to escape into one end of the hollow shaft H and pass in an opposite direction the entire length of the cylinder before they can enter the upper flue D and come into contact with the upper half of the cylinder A. When they leave the hollow drum or shaft H the products of combustion have to travel along in contact with the upper portion of the cylinder A during its entire length before they can make their final exit at the chimney F.

It will be seen that by thus constructing the apparatus, so that the products of combustion are forced to travel along in contact with the lower portion of the vessel A before they are permitted to ascend toward the upper portion, and then forced to travel along the entire length of the cylinder in contact with its upper portion, before they can enter the chimney or exit-flue, the best possible results are attained to, or the greatest amount of heat derived from and utilized in the consumption of a given quantity of fuel; and it will be understood that, by causing the products of combustion to pass into and through the hollow shaft H, after they leave the flue C, and before they enter the flue D, not only is the greatest degree of heat radiated into the material to be dried, but the directions of the currents of heat being reversed, passing from end to end around and through the cylinder and its contained mass, the action of the heat on all parts of the contained charge will be more even, and a better result can be obtained.

As we have remarked, the agitating and disintegrating arms N are arranged helically on the rotatory hollow shaft H. By this arrangement of them these arms are caused to feed the material along toward one or the other end of the cylinder, (according to the direction of rotation of the hollow shaft,) and we propose to have the said hollow shaft rotated, alternately in opposite directions, the proper number of times each way, to produce the best results, until it is necessary to discharge the contents of the cylinder, when the rotation of said shaft and feeding-arms should be continued in one and the proper direction to feed the entire contents toward that end of the cylinder at which is located the discharge or exit man-hole Q. The surrounding and supporting masonry B is, of course, so constructed, with an arched open space at this end of the cylinder, as to permit a free access to the man-hole Q. Otherwise, the cylinder A should be entirely surrounded by the masonry and hot-air flues, so as to lose as little heat as possible by radiation.

The means by which an automatic rotation alternately, in opposite directions, (to any desired extent,) of the hollow shaft H is effected are not shown nor described in this application; but a full description of them may be found in another patent to Michael J. Stein, of which they form part of the subject-matter.

In the operation of drying the scrap in a close vessel it is important not only to keep the mass in a constant state of agitation and perfectly disintegrated, but it is also very necessary to prevent, as much as possible, any caking upon the internal surface of the cylinder A; and, for this purpose, we have found it very much better to employ on the iron arms N a steel square-edged or cutting armor, which will not so soon become rounded or smoothed off and inefficient as do the iron edges heretofore used; and, as the cylinder A, (being made boiler-like and quite large,) is not accurately formed, being of slightly different diameters at different points, and having various little inequalities in its contour, we have found it of great advantage, practically, to make this steel armor, or these cutting and scraping edges $o$, adjustable, (by means of screws $a^2$ arranged in slots $b^2$, as shown in Fig. 1,) so that they may not only be adjusted to adapt them to contour of the internal face of the cylinder A, but may also be fed or set out periodically, as occasion may require.

In the chimney F should be placed a damper, $C^2$, by which the action of the fire, currents of hot air, &c., may be controlled and regulated.

After what has been said very little further explanation of the operation of the apparatus is necessary to those skilled in the art to which our invention relates.

The material to be treated is put into the vessel A through the man-holes P P, which are then sealed up, and, a suitable fire being lighted in the furnace, the drying process is conducted. The contained mass of material, while subjected to the action of dry heat directly radiated inward from the internal face of the cylinder A and outward from the drum H, is kept in a constant state of agitation and is completely disintegrated — and, if it contains no hard substances, is pulverized ready for use—by the action of the arms N, which not only thoroughly and continually stir the mass to assist the extraction of all its contained moisture and bring all the particles successively into contact with different portions of the highly-heated surface, but also causes the charge of material, during this state of agitation, to travel back and forth from end to end of the cylinder, so that, should any one portion of the cylinder or hollow shaft, or of either, possess a greater heating capacity than the rest, it will be brought to bear on all parts of the charge of the material, instead of upon only a portion, as would be the case if the charge were merely stirred round and round, without being fed back and forth endwise in the cylinder.

During the process of the extraction of the moisture the water is converted into steam, which, together with all the noxious vapors and gases generated in the vessel A, passes off through the conductor R, to be treated and disposed of in any one of the known ways.

The details of construction of the apparatus may, of course, be varied in many particulars without departing from the spirit of that part of our invention which relates to improvements in the apparatus, and the latter may be materially changed in its construction without departing from that part of our invention which relates to improvements in the process of drying animal matters made the subject of this application.

Having so fully described our improved process and apparatus that those skilled can practice our invention, what we claim as an improved process for drying all sorts of animal matter, and desire to secure by Letters Patent, is—

The treatment of the material in a closed vessel, and in a state of agitation, by the application of the products of combustion to the exterior of said vessel and to a radiating internal shaft or flue, substantially as described; and

What we claim as new in the apparatus shown and described, and desire to secure by Letters Patent, is—

1. A drying apparatus, composed of a chamber or vessel combined with a suitable furnace, and masonry and flues so arranged that the products of combustion are forced to act on the lower portion of the vesssel before they can ascend to and act on the upper portion, substantially as hereinbefore fully described.

2. In combination with a drying-chamber and a suitable furnace and flues, constructed and operating substantially as described, a hollow shaft or shafts which pass through the drying-chamber and serve as flues for the products of combustion, as and for the purposes described.

3. The combination, with the furnace and a stationary drying vessel, of a suitable means of protection to that part of the vessel subjected to the intensest heat, to prevent the undue heating or burning of any portion of the contained charge, as hereinbefore described.

4. The combination, with the iron stirrers and feeding arms, of steel cutting-edges or armor-plates, as and for the purposes described.

5. Making the said armor-plates or scrapers adjustable, in the manner and for the purposes specified.

In testimony whereof we have hereunto set our hands and seals this 9th day of October, 1872.

COSMORE G. BRUCE. [L. S.]
  MICHAEL J. STEIN. [L. S.]

Witnesses:
 JACOB FELBES,
 GEO. A. GREENSWARD.